United States Patent
Hsiung (10) Patent No.: US 11,482,235 B2
(45) Date of Patent: Oct. 25, 2022

(54) SPEECH ENHANCEMENT METHOD AND SYSTEM

(71) Applicant: QNAP SYSTEMS, INC., New Taipei (TW)

(72) Inventor: Wei Wei Hsiung, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 207 days.

(21) Appl. No.: 16/836,275

(22) Filed: Mar. 31, 2020

(65) Prior Publication Data

US 2020/0312343 A1    Oct. 1, 2020

(30) Foreign Application Priority Data

Apr. 1, 2019 (TW) ................................ 108111477

(51) Int. Cl.
| | |
|---|---|
| *G10L 21/0216* | (2013.01) |
| *H04R 3/04* | (2006.01) |
| *G06N 20/20* | (2019.01) |
| *G06N 3/04* | (2006.01) |
| *G06N 3/08* | (2006.01) |

(52) U.S. Cl.
CPC ........ *G10L 21/0216* (2013.01); *G06N 3/0454* (2013.01); *G06N 3/0481* (2013.01); *G06N 3/08* (2013.01); *G06N 20/20* (2019.01); *H04R 3/04* (2013.01)

(58) Field of Classification Search
CPC .............. G10L 21/0216; G06N 3/0454; G06N 3/0481; G06N 3/08; G06N 20/20; H04R 3/04
See application file for complete search history.

(56) References Cited

U.S. PATENT DOCUMENTS

| | | | |
|---|---|---|---|
| 2015/0066487 A1* | 3/2015 | Matsuo | ................ G10L 21/0208 704/204 |
| 2016/0093313 A1* | 3/2016 | Vickers | ................... G10L 25/60 704/232 |
| 2016/0134984 A1* | 5/2016 | Erkelens | ............. G10L 21/0232 381/56 |
| 2018/0122403 A1 | 5/2018 | Koretzky et al. | |
| 2018/0182411 A1* | 6/2018 | Kaskari | ................. G10L 19/008 |

(Continued)

FOREIGN PATENT DOCUMENTS

| | | |
|---|---|---|
| CN | 109360581 | 2/2019 |
| CN | 109410974 | 3/2019 |

(Continued)

OTHER PUBLICATIONS

Taiwan Patent Office, Office Action dated Jan. 13, 2020, Taiwan.

*Primary Examiner* — Daniel R Sellers
(74) *Attorney, Agent, or Firm* — WPAT, PC (57) ABSTRACT

A speech enhancement method and a speech enhancement system are provided. The speech enhancement method performs two-stage noise suppression by using digital signal processing and neural network approach. The first-stage noise suppression generates artifact signals by reducing stationary noise in the digital audio signals. The second-stage noise suppression performs voice activity detection and further reduces non-stationary noise in the artifact signals. The result of the voice activity detection is fed back to establish or update a noise model used in the first-stage noise suppression.

13 Claims, 6 Drawing Sheets

(56) References Cited

U.S. PATENT DOCUMENTS

| | | | | |
|---|---|---|---|---|
| 2019/0172476 A1* | 6/2019 | Wung | ............... | G10L 21/0364 |
| 2019/0318755 A1* | 10/2019 | Tashev | ................ | G10L 25/84 |
| 2019/0385630 A1* | 12/2019 | Sivaraman | ........... | G06N 3/0481 |
| 2020/0211580 A1* | 7/2020 | Lee | ................ | G10L 21/0208 |

FOREIGN PATENT DOCUMENTS

| | | |
|---|---|---|
| CN | 109427328 | 3/2019 |
| CN | 109427340 | 3/2019 |
| CN | 109524020 | 3/2019 |

* cited by examiner

SPEECH ENHANCEMENT METHOD AND SYSTEM

FIELD OF THE INVENTION

The present disclosure relates to a speech enhancement method and a speech enhancement system, and particularly to a speech enhancement method and a speech enhancement system with two-stage noise suppression.

BACKGROUND OF THE INVENTION

In recent years, intelligent virtual assistant (IVA) and smart speaker have been popularized. These high-tech electronic devices require advanced speech processing. In practice, the accuracy of speech recognition performed by the electronic device is seriously affected by ambient noise. For example, at a noisy restaurant, errors in the speech recognition probably occur even though one's mouth is much close to the receiver of the electronic device. The problems about low signal-to-noise ratio (SNR) and non-stationary noise can not be effectively solved so far. Therefore, it is desired to develop a speech enhancement method and a speech enhancement system which can solve the problems to improve the speech recognition.

SUMMARY OF THE INVENTION

An aspect of the present disclosure provides a speech enhancement method. The method includes steps of: receiving an audio input; converting the audio input into a plurality of successive digital audio signals; sequentially processing the digital audio signals to generate a plurality of corresponding estimated audio signals; and outputting the estimated audio signals. The digital audio signals at least include a first digital audio signal and a second digital audio signal immediately after the first digital audio signal. Each digital audio signal corresponds to an audio frame of the audio input and includes a magnitude signal and a phase signal. A first audio frame corresponding to the first digital audio signal and a second audio frame corresponding to the second digital audio signal partially overlap each other. With regard to the step of sequentially processing the digital audio signals to generate the estimated audio signals, it further includes steps of: processing the first digital audio signal to reduce stationary noise in the first digital audio signal according to a stationary noise suppression model to generate a first artifact signal; a first neural network generating a first voice activity detection signal according to the first digital audio signal; a second neural network generating a first noise suppression signal by reducing non-stationary noise in the first artifact signal according to the first digital audio signal, the first artifact signal and the first voice activity detection signal; generating a first estimated audio signal by combining the first noise suppression signal and the phase signal of the first digital audio signal; and optimizing the stationary noise suppression model according to the first voice activity detection signal, and processing the second digital audio signal according to the optimized stationary noise suppression model to reduce the stationary noise in the second digital audio signal to generate a second estimated signal.

In an embodiment, in the step of processing the first digital audio signal to reduce the stationary noise in the first digital audio signal according to the stationary noise suppression model to generate the first artifact signal, it further includes steps of: computing a non-speech frequency magnitude, and calculating a spectral noise suppression gain; and optimizing stationary noise suppression model. The optimizing method can be selected from numerous speech enhancement algorithms such as Wiener filter or priori signal-to-noise ratio estimation.

In an embodiment, in the step of optimizing the stationary noise suppression model according to the first voice activity detection signal, it further includes steps of: comparing the first voice activity detection signal with a first threshold value; considering the first digital audio signal as a noise signal, updating noise features, such as an average noise magnitude and a noise variance of a noise model, and calculating and updating the spectral noise suppression gain according to the updated noise features when the first voice activity detection signal is smaller than the first threshold value; or keeping the spectral noise suppression gain unchanged when the first voice activity detection signal is not smaller than the first threshold value.

In an embodiment, the first voice activity detection signal generated by the first neural network has a value restricted from 0 to 1 and defined by a sigmoid function, has a value restricted from −1 to 1 and defined by a hyperbolic tangent function or has a value defined by a linear function with minimum to maximum normalization.

In an embodiment, in the step of generating the first voice activity detection signal by the first neural network according to the first digital audio signal, it further includes steps of: transmitting input sections at different time points to the first neural network; the first neural network processing the input sections corresponding to the different time points to generate a plurality of estimated values, which includes a plurality of first estimated values corresponding to the first digital audio signals of the input sections; and generating the first voice activity detection signal according to the first estimated values. Each of the input sections includes the first digital audio signal and at least one other digital audio signal near the first digital audio signal wherein the input sections at different time points are not exactly the same as each other.

In an embodiment, in the step of generating the first voice activity detection signal according to the first estimated values, it further includes steps of: receiving the first estimated values; and calculating an average value of the first estimated values to obtain the first voice activity detection signal.

In an embodiment, in the step of generating the first voice activity detection signal according to the first estimated values, it further includes steps of: receiving the first estimated values; and comparing the first estimated values with a second threshold value to determine the first voice activity detection signal based on majority rule.

Another aspect of the present disclosure provides a speech enhancement system which receives an audio input through a sound collecting device. The speech enhancement system includes a pre-processor, a first-stage noise suppression device, a second-stage noise suppression device and a reconstruction device. The pre-processor is configured to receive the audio input and convert the audio input into a plurality of successive digital audio signals. The successive digital audio signals at least include a first digital audio signal and a second digital audio signal immediately after the first digital audio signal. Each digital audio signal corresponds to an audio frame of the audio input and includes a magnitude signal and a phase signal. A first audio frame corresponding to the first digital audio signal and a second audio frame corresponding to the second digital audio signal partially overlap each other. The first-stage noise suppression device is electrically coupled to the pre-processor and configured to process the first digital audio signal to reduce stationary noise in the first digital audio signal according to a stationary noise suppression condition to generate a first artifact signal. The second-stage noise suppression device is electrically coupled to the first-stage noise suppression device and configured to generate a first voice activity detection signal according to the first digital audio signal, and generate a first noise suppression signal by reducing non-stationary noise in the first artifact signal according to the first digital audio signal, the first artifact signal and the first voice activity detection signal. The reconstruction device is electrically coupled to the second-stage noise suppression device and the pre-processor and configured to generate an estimated audio signal by combining the first noise suppression signal and the phase signal of the first digital audio signal. The first-stage noise suppression device further optimizes the stationary noise suppression model according to the first voice activity detection signal, and processes the second digital audio signal according to the optimized stationary noise suppression model to reduce the stationary noise in the second digital audio signal to generate a second artifact signal.

In an embodiment, the second-stage noise suppression device is a many-to-many recurrent neural network.

In an embodiment, the first-stage noise suppression device utilizes speech enhancement algorithms such as Wiener filter or priori signal-to-noise ratio estimation to estimate a spectral noise suppression gain, and adjusts the first digital audio signal according to the spectral noise suppression gain to generate the first artifact signal.

In an embodiment, the first-stage noise suppression device further compares the first voice activity detection signal with a first threshold value. When the first voice activity detection signal is smaller than the first threshold value, the first-stage noise suppression device considers the first digital audio signal as a noise signal, updates an average noise magnitude and a noise variance of a noise model, and calculates and updates the spectral noise suppression gain according to the updated average noise magnitude and the updated noise variance. Otherwise, the spectral noise suppression gain is kept unchanged.

In an embodiment, the second-stage noise suppression device includes a first recurrent neural network and a second recurrent neural network. The first recurrent neural network is configured to generate the first voice activity detection signal according to the first digital audio signal. The second recurrent neural network is configured to generate the first noise suppression signal by reducing non-stationary noise in the first artifact signal according to the first digital audio signal, the first artifact signal and the first voice activity detection signal.

In an embodiment, the first recurrent neural network receives input sections at different time points. Each input section includes the first digital audio signal and at least one other digital audio signal near the first digital audio signal wherein the input sections at different time points are not exactly the same as each other. The first recurrent neural network processes the input sections corresponding to the different time points to generate a plurality of estimated values which include a plurality of first estimated values corresponding to the first digital audio signals of the input sections. The first recurrent neural network generates the first voice activity detection signal according to the first estimated values.

In an embodiment, the first recurrent neural network includes cascade-connected shift registers configured to provide the input sections by shift operation.

In an embodiment, the first recurrent neural network further includes an activation function circuit restricting a value of the first voice activity detection signal, for example, sigmoid function from 0 to 1, hyperbolic tangent function from −1 to 1, or linear function with minimum to maximum normalization.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
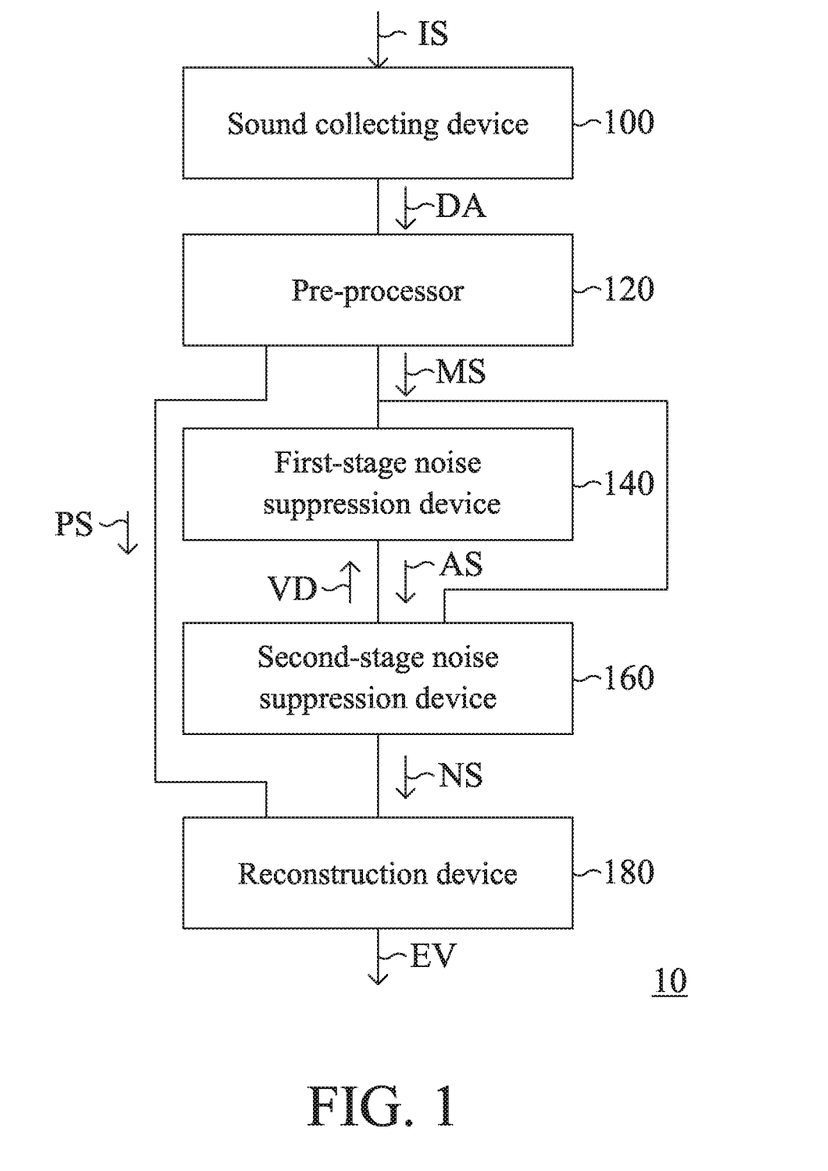
FIG. 1 is a block diagram illustrating a speech enhancement system according to an embodiment of the present disclosure.

Please refer to FIG. 1, which is a block diagram illustrating a speech enhancement system according to an embodiment of the present disclosure. In the embodiment, the speech enhancement system 10 receives various kinds of surrounding sound through a sound collecting device 100 (e.g. microphone, surveillance camera, and the like). The surrounding sound presents in the form as an analog signal, and defined as an analog audio input IS hereinafter. For latter digital signal processing, the sound collecting device 100 should convert the analog audio input IS into a digital audio input DA in advance. In another embodiment, the speech enhancement system 10 receives a digital audio input DA directly from a signal transmission device without the sound collecting device 100 of FIG. 1. In addition, the speech enhancement system 10 further includes a pre-processor 120, a first-stage noise suppression device 140, a second-stage noise suppression device 160 and a reconstruction device 180. As shown in FIG. 1, the pre-processor 120 is electrically coupled to the sound collecting device 100, the first-stage noise suppression device 140, the second-stage noise suppression device 160 and the reconstruction device 180. The first-stage noise suppression device 140 is further electrically coupled to the second-stage noise suppression device 160, while the second-stage noise suppression device 160 is further electrically coupled to the reconstruction device 180.

In this embodiment, the pre-processor 120 receives the digital audio input DA, and then divides/frames a section of the digital audio input DA into audio frames. Two successive audio frames partially overlapping each other to ensure that any short audio feature can be completely observed within a frame. In other words, for an nth audio frame and an (n+1)th audio frame obtained from the framing operation, when the (n+1)th audio frame is immediately after the nth audio frame, a tail portion of the nth audio frame and a head portion of the (n+1)th audio frame overlap. After acquiring a plurality of audio frames, the pre-processor 120 uses a window function to enhance the continuity of any two successive audio frames, and then performs short-time Fourier transform (STFT) on the audio frames of the audio input to obtain a series of digital audio signals.

Concretely, in real-time processing, it is impossible to capture a complete signal for one-time processing. The real steps, collectively called short-time Fourier transform analysis, include framing the audio input by dividing a section of the audio input into successive audio frames, and then performing short-time Fourier transform on the audio frames in batches. To ensure integrality and continuity of the speech data during the conversion, there is an overlap (e.g. 50%) between any two successive audio frames. The data in each audio frame is multiplied by a window function (e.g. Hamming window or Hann window) serving as a weighting factor. The window function is usually near a maximum in the middle, and tapering away from the middle. The multiplication of the audio frames and the window function can avoid amplitude distortion due to overlaps between the audio frames. The frame width, overlap ratio and window function for the framing are adjustable and derivable in the field of digital signal processing, and the particulars are not limited to the embodiment.

One digital audio signal corresponds to one audio frame in a one-to-one manner. Each digital audio signal includes a magnitude signal MS and a phase signal PS. For example, the data in the nth audio frame is processed to generate the nth digital audio signal which includes a magnitude signal MS and a phase signal PS. Similarly, the data in the (n+1)th audio frame is processed to generate the (n+1)th digital audio signal which also includes a magnitude signal MS and a phase signal PS. When the data in the nth audio frame is different from the data in the (n+1)th audio frame, the magnitude signal MS and the phase signal PS of the nth digital audio signal are different from the magnitude signal MS and the phase signal PS of the (n+1)th digital audio signal. For illustration purposes, the specification only focuses on the nth digital audio signal and the (n+1)th digital audio signal in the signal processing sequence to realize the possible logic circuits or program.

After acquiring the nth digital audio signal, the magnitude signal MS of the nth digital audio signal is transmitted to the first-stage noise suppression device 140 and the second-stage noise suppression device 160, and the phase signal PS of the nth digital audio signal is transmitted to the reconstruction device 180.

After receiving the magnitude signal MS of the nth digital audio signal, the first-stage noise suppression device 140 (using digital signal processing approach) processes the magnitude signal MS according to a presetting stationary noise suppression model to reduce stationary noise in the magnitude signal MS and generate a corresponding nth artifact signal AS. In the embodiment, the first-stage noise suppression device 140 could use a known digital processing circuit or a series of digital processing circuits designed for reducing the stationary noise. For example, the first-stage noise suppression device 140 treats the digital audio signals, obtained in predetermined initial duration before the voice activity detection (VAD), as pure noise to establish an initial noise model, and acquires average noise magnitude and noise variance of the digital audio signals in the noise model. The average noise magnitude and the noise variance are taken to calculate the spectral noise suppression gain. Then, stationary noise suppression is performed according to the spectral noise suppression gain, called the stationary noise suppression model in the specification.

The nth artifact signal AS generated by the first-stage noise suppression device 140 is transmitted to the second-stage noise suppression device 160. Please refer to FIG. 2, which is a block diagram illustrating a second-stage noise suppression device according to an embodiment of the present disclosure. In the embodiment, the second-stage noise suppression device 160 (using neural network approach) includes a recurrent neural network (RNN) 162 for voice activity detection and a recurrent neural network 164 for noise suppression. At first, the recurrent neural network 162 generates a voice activity detection signal (VAD signal) VD (called nth voice activity detection signal VD hereinafter) according to and corresponding to the magnitude signal MS of the nth digital audio signal. Then, the recurrent neural network 164 generates an nth noise suppression signal NS according to the magnitude signal MS of the nth digital audio signal, the nth artifact signal AS and the nth voice activity detection signal VD. The nth noise suppression signal NS is obtained by reducing the non-stationary noise in the nth artifact signal AS. Subsequently, the nth voice activity detection signal VD is fed back to the first-stage noise suppression device 140. Afterwards, the first-stage noise suppression device 140 optimizes the stationary noise suppression model in response to the nth voice activity detection signal VD, and processes the (n+1)th digital audio signal according to the optimized stationary noise suppression model so as to reduce the stationary noise in the (n+1)th digital audio signal to generate an (n+1)th artifact signal AS.

Figure 2:
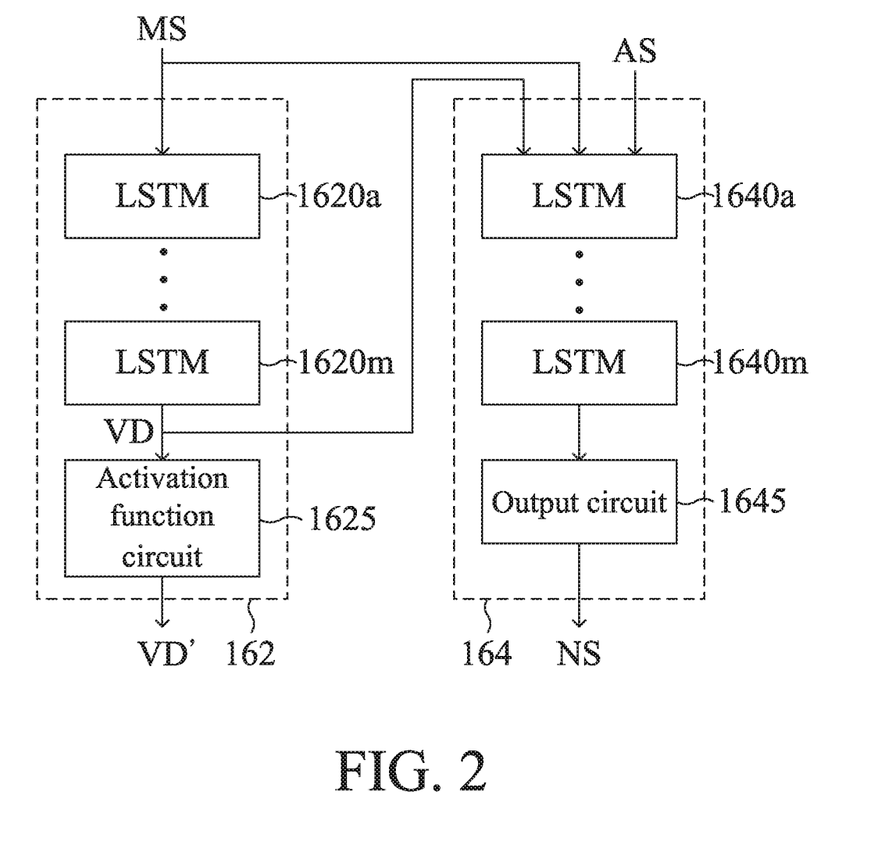
FIG. 2 is a block diagram illustrating a second-stage noise suppression device according to an embodiment of the present disclosure.

Two databases are required for the above-described second-stage noise suppression device 160, i.e. clean speech database and ambient noise database. The clean speech data is mixed with the ambient noise data based on various signal-to-noise ratios to provide input samples in the training process, while the clean speech data serves as output noise suppression samples of the training process. When audio energy in the audio frame of the clean speech signal indicates that the audio frame is a speech audio frame, a value "1" is assigned to the voice activity detection signal, and otherwise a value "0" is assigned to the voice activity detection signal corresponding to a non-speech audio frame. Each training sample has a respective signal-to-noise ratio $d_{Train}$, randomly selected from −5 dB to 20 dB. The magnitude of the spectrum is normalized and the normalized magnitude $d_{norm}$ ranges from −40 dB to 30 dB. In the second-stage noise suppression device 160, the recurrent neural network 162 and the recurrent neural network 164 include long short-term memory (LSTM) layers 1620a~1620m and long short-term memory (LSTM) layers 1640a~1640m, respectively, and generate outputs through a fully connected layer of an activation function (e.g. sigmoid function, hyperbolic tangent function or linear function) circuit 1625 and a fully connected layer of a output circuit 1645, respectively. Before being transmitted to the first-stage noise suppression device 140, the voice activity detection signal VD is transmitted to the activation function circuit 1625 to be converted into a processed voice activity detection signal VD' with a restricted value range in advance. For example, the activation function circuit 1625 may use a sigmoid function (restricted value range from 0 to 1), a hyperbolic tangent function (restricted value range from −1 to 1) or a linear function with minimum to maximum normalization. The noise suppression signal NS is directly output through the output circuit 1645 without being further processed by a limiting function. In the training process, the voice activity detection belongs to a binary classification problem, and the loss function is the cross entropy between the ground truth and the estimated voice activity detection signal generated by the recurrent neural network 162 of the second-stage noise suppression device 160 in response to each input sample. On the other hand, the ambient noise suppression belongs to a regression problem, and the loss function is the mean square error (MSE) between the clean speech signal and the noise suppression signal NS generated by the recurrent neural network 164 of the second-stage noise suppression device 160 in response to each input sample. It is to be noted that the network layer can adopt any proper variant of recurrent neural network layer, and the loss functions of the classification and regression can adopt any function suitable for training deep neural network (DNN). The particulars are not limited to the embodiments.

After receiving the nth noise suppression signal NS, the reconstruction device 180 combines the nth noise suppression signal NS and the phase signal PS of the nth digital audio signal to generate the estimated audio signal EV.

Figure 3:
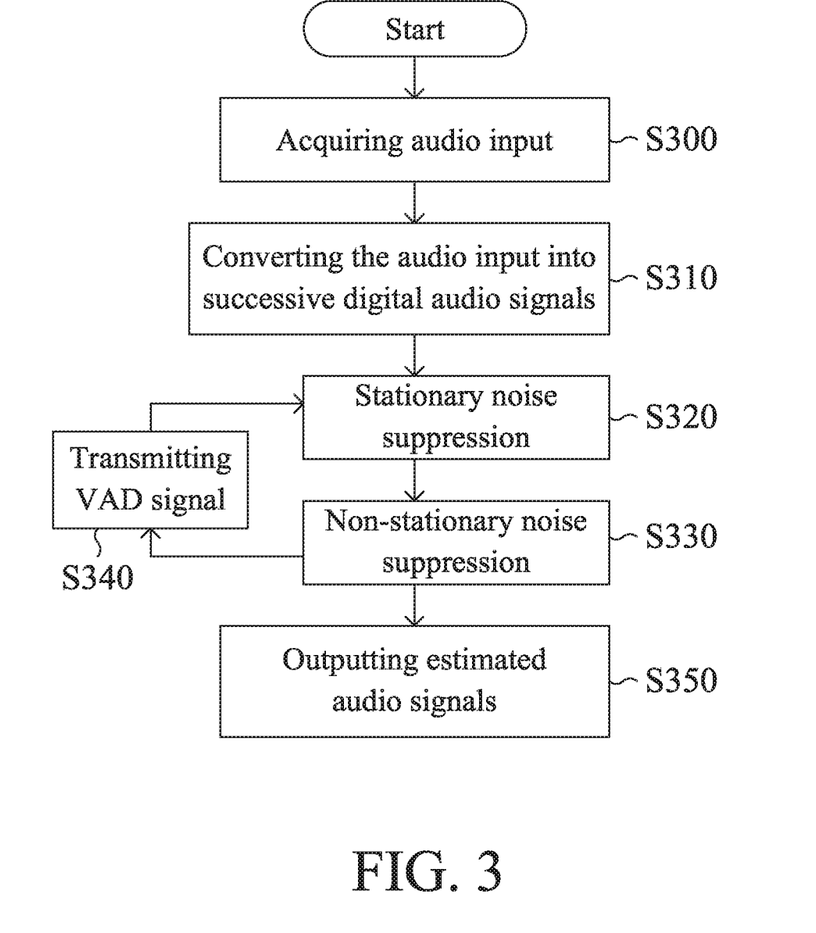
FIG. 3 is a flowchart illustrating a speech enhancement method according to an embodiment of the present disclosure.
Figure 4:
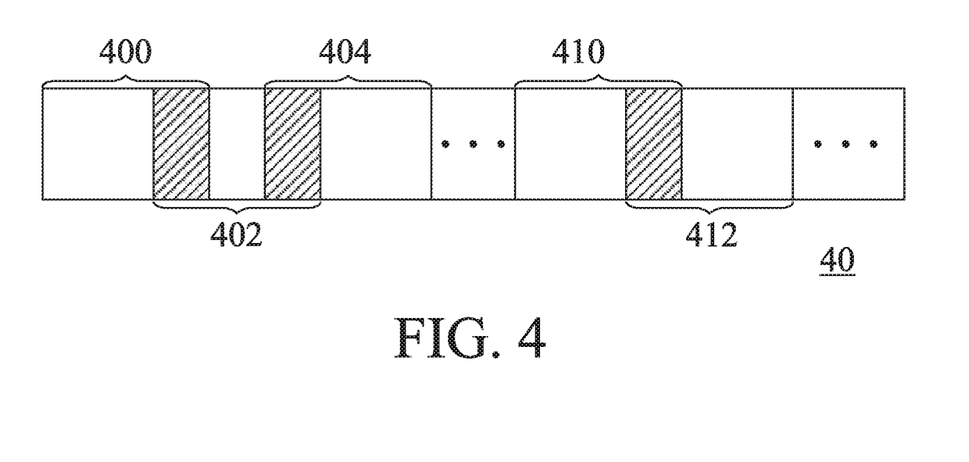
FIG. 4 is a schematic diagram illustrating an audio input and audio frames included in the audio input according to an embodiment of the present disclosure.

Please refer to both FIG. 1 and FIG. 3 for illustration of an embodiment of the speech enhancement method. FIG. 3 is a flowchart illustrating the speech enhancement method according to an embodiment of the present disclosure. In the embodiment, at first, the sound collecting device 100 or the like acquires an audio input (e.g. analog audio input IS or digital audio input DA) (step S300). Since the later steps adopt digital signal processing, a digital audio input is preferred. Nevertheless, an analog audio input is applicable and should be converted into a digital audio input before the digital signal processing. After acquiring the audio input, the pre-processor 120 converts the audio input into successive digital audio signals (step S310). As shown in FIG. 4, the audio input is divided into overlapping audio frames 400, 402, 404, ... 410, 412, ..., and shaded portions indicate the overlapping portions between two adjacent audio frames. Each audio frame is weighted by a window function, and then subjected to short-time Fourier transform to obtain a corresponding digital audio signal, including a magnitude signal MS and a phase signal PS. The framing step has been described concretely in the previous embodiment, and repetitive description is not given herein.

Figure 5:
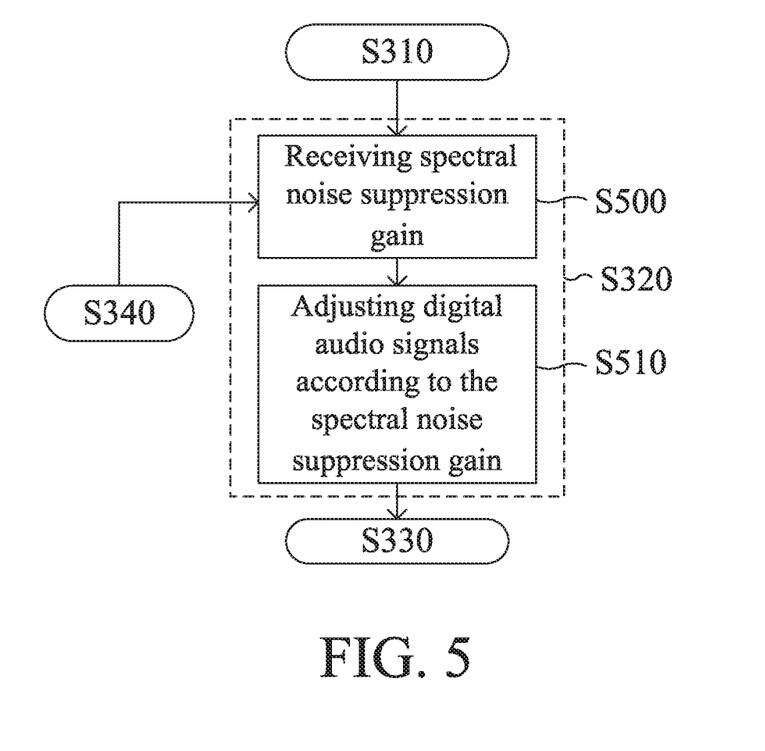
FIG. 5 is a flowchart illustrating a stationary noise suppression process according to an embodiment of the present disclosure.

Then, each digital audio signal is processed for stationary noise suppression (step S320). Please refer to FIG. 5, which is a flowchart illustrating a stationary noise suppression process according to an embodiment of the present disclosure. In the embodiment, the stationary noise suppression process (using digital signal processing approach) in the step S320 includes steps of receiving the spectral noise suppression gain under the current setting (step S500), and adjusting the digital audio signal according to the spectral noise suppression gain (step S510). After the processing in the step S510, the stationary noise of the digital audio signal is reduced so as to obtain the artifact signal AS.

Figure 6:
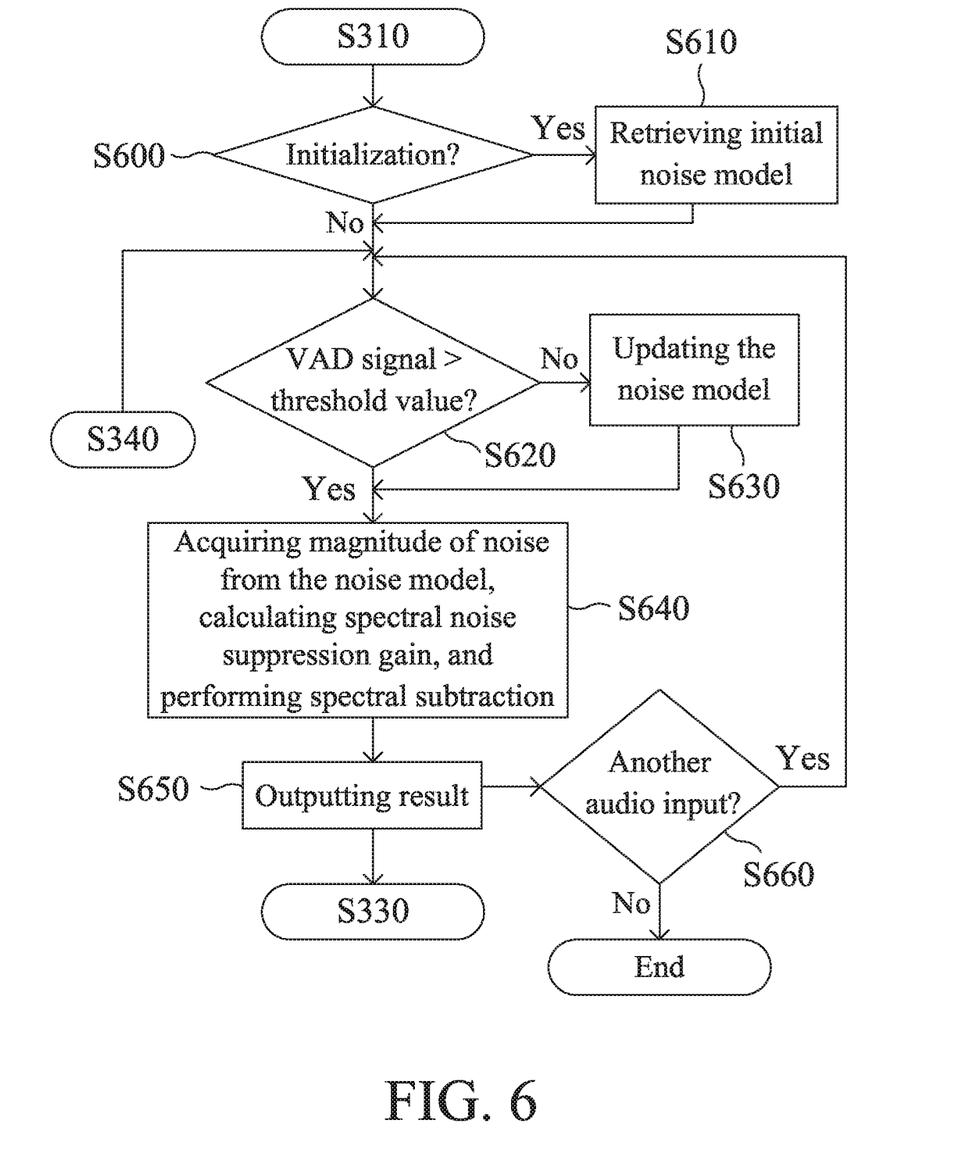
FIG. 6 is a flowchart illustrating a stationary noise suppression process according to another embodiment of the present disclosure.

Please refer to FIG. 6, which is a flowchart illustrating a stationary noise suppression process according to another embodiment of the present disclosure. In the embodiment, once entering the step S320, it is determined whether initialization operation is required (step S600). To initialize the operation, the process goes to step S610 to retrieve an initial noise model. In this step, the initial noise model could be established by collecting all sounds in predetermined initial duration (e.g. 0.25 s) and treating the collected sounds as pure noise. The initial noise model is close to and fit for the current environment.

After receiving the initial noise model, the speech enhancement system 10 judges whether to update the noise model according to the voice activity detection signal VD or VD' (step S620). If the voice activity detection signal VD (or VD') is smaller than a preset threshold value, it represents that the audio input or the corresponding digital audio signal does not include speech data. Therefore, the audio input or the corresponding digital audio signal is considered as a noise signal and taken to update noise features of the current noise model (e.g. average noise magnitude or noise variance) (step S630) for improving latter stationary noise suppression. Otherwise, if the voice activity detection signal VD (or VD') is not less than the preset threshold value, it represents that the audio input or the corresponding digital audio signal includes speech data. Therefore, the current noise model is kept unchanged for the following operation. In an embodiment, the noise model could be updated by statistically calculating average magnitude, in specific frequency band, of all audio input which does not include speech data, and smoothing the magnitude of the noise (noise spectra) by momentum term. It is to be noted that the updating algorithm is not limited to the embodiment.

After confirming the noise model to be used, the speech enhancement system 10 acquires the magnitude of the noise from the noise model, calculates the spectral noise suppression gain by speech enhancement algorithm (e.g. Wiener filter or priori signal-to-noise ratio estimation) according to the magnitude, and performs spectral subtraction (e.g. minimum mean square error or multi-band spectral subtraction) to reduce the stationary noise in the audio frame according to the spectral noise suppression gain (step S640). The above-described artifact signal AS is obtained after the step S640. Subsequently, the artifact signal AS is transmitted to the second-stage noise suppression device 160 (step S650) for further processing. At this time, the noise suppression process checks whether any other audio input or digital audio signal is waiting to be processed (step S660). If there is no to-be-processed audio input or digital audio signal anymore, the noise suppression process ends. Otherwise, if there still exists any to-be-processed audio input or digital audio signal, the noise suppression process goes to step S620 to process the next audio input or digital audio signal.

Please refer back to FIG. 1 and FIG. 3. The artifact signal AS generated in the stationary noise suppression process (step S320) and the magnitude signal MS of the corresponding digital audio signal are transmitted to the second-stage noise suppression device 160. The second-stage noise suppression device 160 performs the non-stationary noise suppression process (using neural network processing approach) on the received signals (step S330). The non-stationary noise suppression process involves two parts. The first part is voice activity detection operation responsible for learning the characteristics of voiceprints to judge whether the audio frame corresponding to the current digital audio signal is a speech audio frame. The judgment result (e.g. the voice activity detection signal VD or VD') is fed back to the first-stage noise suppression device 140 as the statistical base for calculating the spectral noise suppression gain (step S340). The second part is noise suppression operation responsible for reducing non-stationary noise together with repairing damaged voice characteristics based on magnitude signal of the noise.

A noise suppression signal NS is obtained after the non-stationary noise suppression process. The noise suppression signal NS is transmitted to the reconstruction device 180. The reconstruction device 180 performs inverse-short-time Fourier transform on the phase signal PS obtained before the noise suppression processes and the magnitude signal (i.e. noise suppression signal NS) obtained after the noise suppression processes into an estimated audio signal EV in the time domain. By performing an overlap-add method to combine the audio frames, speech enhancement output is provided. In the speech enhancement method according to the present disclosure, the phase signal of each digital audio signal is not subjected to the noise suppression process because the statistical model shows that the signal in the frequency domain has real and imaginary parts independent and identically distributed (IID). The real part and the imaginary part of the noise in the frequency domain are independent random variables with Gaussian distribution and zero-sum. The phase of the speech in the frequency domain is a random variable ranging from $-\pi$ to $\pi$. If the real part and the imaginary part of the speech are not changed after the noise suppression processes, the energy variance is a Gaussian random variable with zero-sum property. Therefore, the set of speech energy variances, statistically independent, is defined as a stochastic process (random process). For this reason, the phase signal after the noise suppression processes could be considered equivalent to the phase signal before the noise suppression processes so as to simplify the calculation.

Figure 7:
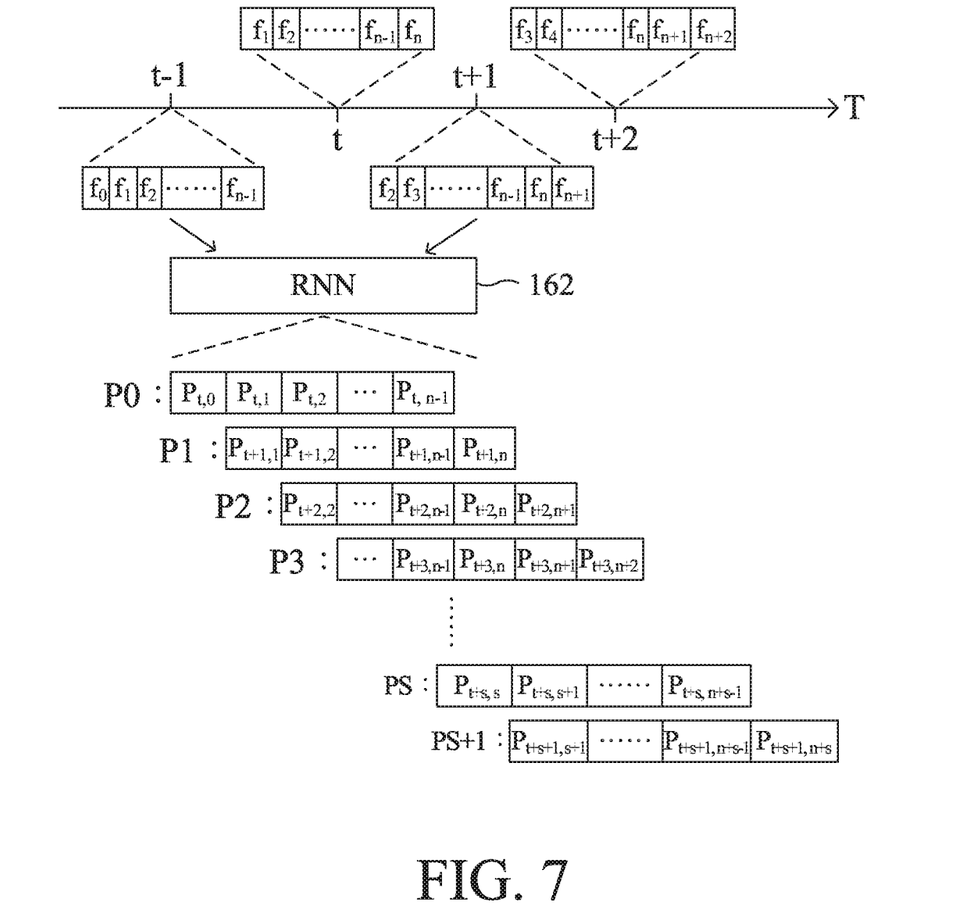
FIG. 7 is a schematic diagram illustrating a voice activity detection process according to an embodiment of the present disclosure.

The voice activity detection process is described with reference to FIG. 7. In this embodiment, each audio input has been divided to a plurality of audio frames, and each audio frame corresponds to the magnitude signal of one digital audio signal. At any time point along the time axis T, the second-stage noise suppression device 160 receives a fixed number of successive magnitude signals included in one input section, and performs the voice activity detection for these magnitude signals with the recurrent neural network 162 shown in FIG. 2. According to the definition, the magnitude signal of the mth digital audio signal is called the mth magnitude signal and denoted by $f_m$. For example, the magnitude signal of the zeroth digital audio signal is called the zeroth magnitude signal $f_0$, the magnitude signal of the first digital audio signal is called the first magnitude signal $f_1$, the magnitude signal of the nth digital audio signal is called the nth magnitude signal $f_n$, and so forth. In response to the input of the magnitude signals, the recurrent neural network 162 generates an estimated voice activity matrix correspondingly. In the embodiment, the recurrent neural network 162 generates a set of estimated result corresponding to the input magnitude signals, and the set of estimated result includes estimated values indicating whether voice activities are present in the magnitude signals. In the diagram, the magnitude signal $f_{n-1}$ in the nth term of the input at the time point t−1 corresponds to an estimated value $P_{t-1,n-2}$; the magnitude signal $f_n$ in the nth term of the input at the time point t corresponds to an estimated value $P_{t,n-1}$; the magnitude signal $f_{n+1}$ in the nth term of the input at the time point t+1 corresponds to an estimated value $P_{t+1,n}$; and so forth.

In the embodiment, at each time point, n magnitude signals are transmitted to the recurrent neural network 162, and the combinations of the n magnitude signals at different time points are not exactly the same. That is, the input sections are not equivalent to each other. As shown in FIG. 7, the n magnitude signals successively transmitted to the recurrent neural network 162 at the time point t−1 include the zeroth magnitude signal $f_0$, the first magnitude signal $f_1$, the second magnitude signal $f_2$, ..., the (n−1)th magnitude signal $f_{n-1}$; the n magnitude signals successively transmitted to the recurrent neural network 162 at the time point t include the first magnitude signal $f_1$ through the nth magnitude signal $f_n$; the n magnitude signals successively transmitted to the recurrent neural network 162 at the time point t+1 include the second magnitude signal $f_2$ through the (n+1)th magnitude signal $f_{n+1}$; the n magnitude signals successively transmitted to the recurrent neural network 162 at the time point t+2 include the third magnitude signal $f_3$ through the (n+2)th magnitude signal $f_{n+2}$; and so forth. The magnitude signals could be transmitted through any known way. For example, n cascade-connected shift registers are provided to perform one shift operation at every time point repetitively.

In response to the input magnitude signals at different time points, the recurrent neural network 162 generates corresponding sets of estimated results P0~PS+1. These sets of estimated results indicate whether the corresponding digital audio signals include speech data in estimation. Each set of the estimated result P0~PS+1 includes n estimated values. For taking the most samples to estimate and determine the voice activity detection signal of individual digital audio signal, all estimated values related to the specific digital audio signal are considered. For example, the estimate value related to the zeroth digital audio signal includes the estimated value $P_{t,0}$, which is taken to determine the voice activity detection signal of the zeroth digital audio signal. Further for example, the estimate values related to the nth digital audio signal includes the estimated values $P_{t+1,n}, P_{t+2,n}, P_{t+3,n}, \ldots, P_{t+s,n}$, which are taken to determine the voice activity detection signal of the nth digital audio signal. The present disclosure takes multiple estimated values to determine the voice activity detection signal to smooth the estimation of the voice activity detection signal and result in valid and proper estimation.

The voice activity detection signal could be determined according the estimated values by any suitable approach to meet requirements. For example, the voice activity detection signal is determined according to average values of the related estimated values, or based on majority rule. In an embodiment, when the voice activity detection signal is determined based on the majority rule, the estimated values related to the specific digital audio signal are compared with a threshold value. If most estimated values are greater than the threshold value, the corresponding voice activity detection signal is set to indicate that the digital audio signal involves speech data. Otherwise, if most estimated values are smaller than the threshold value, the corresponding voice activity detection signal is set to indicate that the digital audio signal involves no speech data.

As described above, after the first-stage noise suppression device 140 has processed the nth artifact signal corresponding to the nth digital audio signal, the recurrent neural network 162 of the second-stage noise suppression device 160 generates the nth voice activity detection signal, and feeds the nth voice activity detection signal back to the first-stage noise suppression device 140. Therefore, the first-stage noise suppression device 140 can determine whether to update the noise model with the nth digital audio signal or not according to the nth voice activity detection signal.

In conclusion, the present disclosure provides a two-stage noise suppression method to enhance the speech signals. The first-stage noise suppression process is a stationary noise suppression process, which uses the feedback voice activity detection signals to increase the signal-to-noise ratio with respect to the stationary noise. Furthermore, the artifact signals with high signal-to-noise ratio are advantageous for the many-to-many neural network to perform the second-stage noise suppression process with better voice activity detection. By means of smoothing energy, the neural network at the second stage can avoid estimation error due to syllable pause or aspirated sound. Thus, it improves the accuracy of the voice activity detection. Therefore, the second stage can reduce interference resulting from non-detected voice while establishing the noise model according to the voice activity detection at the first stage. The speech enhancement method and the speech enhancement system of the present disclosure can effectively process audio signals which have uncomfortable low signal-to-noise ratio and non-stationary noise.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A speech enhancement method comprising steps of:
   receiving an audio input;
   converting the audio input into a plurality of successive digital audio signals, at least comprising a first digital audio signal and a second digital audio signal immediately after the first digital audio signal, each of the digital audio signals corresponding to an audio frame of the audio input and comprising a magnitude signal and a phase signal, a first audio frame corresponding to the first digital audio signal and a second audio frame corresponding to the second digital audio signal partially overlapping each other;
   sequentially processing the digital audio signals to generate a plurality of corresponding estimated audio signals, comprising steps of:
   processing the first digital audio signal to reduce stationary noise in the first digital audio signal according to a stationary noise suppression model to generate a first artifact signal by receiving a spectral noise suppression gain as the stationary noise suppression model and adjusting the first digital audio signal according to the spectral noise suppression gain to generate the first artifact signal;
   a first neural network generating a first voice activity detection signal according to the first digital audio signal;
   a second neural network generating a first noise suppression signal by reducing non-stationary noise in the first artifact signal according to the first digital audio signal, the first artifact signal and the first voice activity detection signal;
   generating a first one of the estimated audio signals by combining the first noise suppression signal and the phase signal of the first digital audio signal; and
   optimizing the stationary noise suppression model according to the first voice activity detection signal, and processing the second digital audio signal according to the optimized stationary noise suppression model to reduce the stationary noise in the second digital audio signal to generate a second artifact signal; and
   outputting the estimated audio signals,
   wherein the step of optimizing the stationary noise suppression model according to the first voice activity detection signal comprises steps of:
   comparing the first voice activity detection signal with a first threshold value;
   when the first voice activity detection signal is smaller than the first threshold value, the step of optimizing the stationary noise suppression model comprising steps of:
   considering the first digital audio signal as a noise signal and updating a noise feature of a noise model; and
   calculating and updating the spectral noise suppression gain according to the updated noise feature; or
   when the first voice activity detection signal is not smaller than the first threshold value, the spectral noise suppression gain being kept unchanged.

2. The speech enhancement method according to claim 1, wherein the first voice activity detection signal generated by the first neural network has a value restricted from 0 to 1.

3. The speech enhancement method according to claim 1, wherein the first voice activity detection signal generated by the first neural network has a value restricted by a hyperbolic tangent function from −1 to 1 or a linear function with minimum to maximum normalization.

4. The speech enhancement method according to claim 1, wherein the step of generating the first voice activity detection signal by the first neural network according to the first digital audio signal further comprises steps of:
   transmitting input sections at different time points to the first neural network, each of the input sections comprising the first digital audio signal and at least one of the digital audio signals other than and near the first digital audio signal wherein the input sections at different time points are not exactly the same as each other;
   the first neural network processing the input sections corresponding to the different time points to generate a plurality of estimated values, the estimated values comprising a plurality of first estimated values corresponding to the first digital audio signals of the input sections; and
   generating the first voice activity detection signal according to the first estimated values.

5. The speech enhancement method according to claim 4, wherein the step of generating the first voice activity detection signal according to the first estimated values further comprises steps of:
   receiving the first estimated values; and
   calculating an average value of the first estimated values to obtain the first voice activity detection signal.

6. The speech enhancement method according to claim 4, wherein the step of generating the first voice activity detection signal according to the first estimated values further comprises steps of:
   receiving the first estimated values; and
   comparing the first estimated values with a second threshold value to determine the first voice activity detection signal based on majority rule.

7. A speech enhancement system receiving an audio input through a sound collecting device, the speech enhancement system comprising:
   a pre-processor configured to receive the audio input and convert the audio input into a plurality of successive digital audio signals, the successive digital audio signals at least comprising a first digital audio signal and a second digital audio signal immediately after the first digital audio signal, each of the digital audio signals corresponding to an audio frame of the audio input and comprising a magnitude signal and a phase signal, a first audio frame corresponding to the first digital audio signal and a second audio frame corresponding to the second digital audio signal partially overlapping each other;
   a first-stage noise suppression device electrically coupled to the pre-processor, configured to process the first digital audio signal to reduce stationary noise in the first digital audio signal according to a stationary noise suppression model to generate a first artifact signal, wherein the first-stage noise suppression device receives a spectral noise suppression gain as the stationary noise suppression model, and adjusts the first digital audio signal according to the spectral noise suppression gain to generate the first artifact signal;
   a second-stage noise suppression device electrically coupled to the first-stage noise suppression device, configured to generate a first voice activity detection signal according to the first digital audio signal, and generate a first noise suppression signal by reducing non-stationary noise in the first artifact signal according to the first digital audio signal, the first artifact signal and the first voice activity detection signal; and
   a reconstruction device electrically coupled to the second-stage noise suppression device and the pre-processor, configured to generate an estimated audio signal by combining the first noise suppression signal and the phase signal of the first digital audio signal,
   wherein the first-stage noise suppression device further optimizes the stationary noise suppression model according to the first voice activity detection signal, and processes the second digital audio signal according to the optimized stationary noise suppression model to reduce the stationary noise in the second digital audio signal to generate a second artifact signal,
   wherein the first-stage noise suppression device optimizes the stationary noise suppression model by comparing the first voice activity detection signal with a first threshold value, where:
      when the first voice activity detection signal is smaller than the first threshold value, the first-stage noise suppression device considers the first digital audio signal as a noise signal, updates a noise feature of a noise model, and calculates and updates the spectral noise suppression gain according to the updated noise feature, or
      when the first voice activity detection signal is not smaller than the first threshold value, the spectral noise suppression gain is kept unchanged.

8. The speech enhancement system according to claim 7, wherein the second-stage noise suppression device is a many-to-many recurrent neural network.

9. The speech enhancement system according to claim 7, wherein the second-stage noise suppression device comprises:
   a first recurrent neural network configured to generate the first voice activity detection signal according to the first digital audio signal; and
   a second recurrent neural network configure to generate the first noise suppression signal by reducing the non-stationary noise in the first artifact signal according to the first digital audio signal, the first artifact signal and the first voice activity detection signal.

10. The speech enhancement system according to claim 9, wherein the first recurrent neural network receives input sections at different time points, each of the input sections comprising the first digital audio signal and at least one of the digital audio signals other than and near the first digital audio signal wherein the input sections at different time points are not exactly the same as each other,
   wherein the first recurrent neural network processes the input sections corresponding to the different time points to generate a plurality of estimated values, the estimated values comprising a plurality of first estimated values corresponding to the first digital audio signals of the input sections,
   wherein the first recurrent neural network generates the first voice activity detection signal according to the first estimated values.

11. The speech enhancement system according to claim 10, wherein the first recurrent neural network comprises cascade-connected shift registers configured to provide the input sections by shift operation.

12. The speech enhancement system according to claim 9, wherein the first recurrent neural network further comprises an activation function circuit restricting a value of the first voice activity detection signal from 0 to 1.

13. The speech enhancement system according to claim 9, wherein the first recurrent neural network further comprises an activation function circuit using a hyperbolic tangent function to restrict a value of the first voice activity detection signal from −1 to 1 or a linear function with minimum to maximum normalization.

* * * * *